(12) United States Patent
Noguchi et al.

(10) Patent No.: US 9,025,327 B2
(45) Date of Patent: May 5, 2015

(54) PORTABLE TABLET FOLIO STAND

(75) Inventors: Hiroyuki Noguchi, Yokohama (JP); Eiji Shinohara, Kawasaki (JP); Hideaki Hasegawa, Tokyo (JP); Hisashi Shima, Yokohama (JP); Tomoyuki Takahashi, Fujisawa (JP); Aaron Michael Stewart, Raleigh, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 294 days.

(21) Appl. No.: 13/538,194

(22) Filed: Jun. 29, 2012

(65) Prior Publication Data

US 2014/0002977 A1    Jan. 2, 2014

(51) Int. Cl.
*H05K 5/00* (2006.01)
*H05K 7/00* (2006.01)
*G06F 1/16* (2006.01)

(52) U.S. Cl.
CPC ............ *G06F 1/1632* (2013.01); *G06F 1/1654* (2013.01); *G06F 1/1669* (2013.01); *G06F 1/1681* (2013.01)

(58) Field of Classification Search
CPC ... G06F 1/1626; G06F 1/1601; G06F 1/1632; G06F 1/1654; G06F 1/1669
USPC .................................. 361/679.17, 679.41
See application file for complete search history.

(56) References Cited

U.S. PATENT DOCUMENTS

| | | | |
|---|---|---|---|
| 6,700,775 B1 * | 3/2004 | Chuang et al. | 361/679.01 |
| 6,781,823 B1 * | 8/2004 | Nyack | 361/679.29 |
| 6,882,524 B2 * | 4/2005 | Ulla et al. | 361/679.09 |
| 6,940,713 B2 | 9/2005 | Huang et al. | |
| 7,002,794 B2 | 2/2006 | Wang et al. | |
| 7,379,382 B2 * | 5/2008 | LaBerge | 365/233.19 |
| 7,916,468 B2 * | 3/2011 | Takizawa | 361/679.44 |
| 8,665,589 B2 * | 3/2014 | Lin | 361/679.41 |
| 2006/0007645 A1 | 1/2006 | Chen et al. | |
| 2010/0022719 A1 * | 1/2010 | Ohrbom | 525/533 |

* cited by examiner

*Primary Examiner* — Anthony Haughton
(74) *Attorney, Agent, or Firm* — Nutter McClennen & Fish LLP; John J. Penny, Jr.; Megan E. Jeans

(57) ABSTRACT

Some embodiments of the present invention include a portable tablet folio stand that is designed for use in multiple modes. The stand can allow a user to view the tablet from multiple angles, such as a movie viewing angle and a working angle. In the movie viewing angle, the tablet is optimally positioned for viewing the tablet screen, for instance to watch videos. In the working angle, the tablet is optimally positioned for performing tasks such as typing on the tablet. In some embodiments, the tablet stand can be configured to be portable and detachably coupled to a keyboard.

21 Claims, 9 Drawing Sheets

PORTABLE TABLET FOLIO STAND

FIELD OF THE INVENTION

The present invention relates generally to folio stands and more particularly, to a portable tablet folio stand.

BACKGROUND

A tablet computer, or other portable electronic device, (collectively referred to herein as "tablet") can be used with a keyboard and stand device. Often, the keyboard and stand are integrally formed in a bulky and cumbersome device. When coupled to the keyboard, the tablet and the keyboard can form a dual-usage portable computer and may be cumbersome to users who wish to have a portable and detachable keyboard and stand for their tablet. Users may further wish to view their tablets from multiple angles and positions, depending on the desired use of the tablet. Often, stand devices are inflexible in their operating positions. Therefore, it is desirable to provide a device that solves the aforesaid problems.

SUMMARY OF THE INVENTION

In at least one embodiment, a portable tablet folio includes a keyboard configured to be wirelessly coupled to a tablet computer, a tablet stand detachably coupled to the keyboard and configured to operate in a first usage mode and a second usage mode. The tablet stand can further include a base member having at least one support flange on at least a side of the base member and a first plate pivotably coupled to the base member and configured to lay flat in a storage position and to articulate to a usage position thereby allowing the stand to operate in the first usage mode.

The portable tablet folio can further have a second plate pivotably coupled to the base member and the first plate, wherein the second plate is configured to lay in a flat storage position and to articulate to a usage position thereby allowing the stand to operate in a second usage mode. The base member can further include a keyboard coupling mechanism having at least one elongate member configured to be received by the keyboard. The tablet stand can be configured to support a tablet when the tablet stand is not coupled to the keyboard. The portable tablet folio can be configured to allow the keyboard and the tablet stand to lay substantially flat. Further, the keyboard can include a support flange on at least a side of the keyboard.

In some embodiments, a portable tablet folio can have a keyboard comprising input keys and a stand receiving mechanism, and a stand member configured to be detachably coupled to the keyboard at the stand receiving mechanism. The stand member can include at least one support plate and a base member wherein the at least one support plate is pivotably coupled to the base member so as to allow the at least one support plate to be substantially flat to the base member in a first position and extend at an angle to support weight in a second position.

The portable tablet folio can have at least one outer plate pivotably coupled to the base portion and the at least one support plate so as to allow concurrent articulation of both the at least one support plate and the at least one outer plate. Furthermore, the portable tablet folio can include a locking mechanism configured to fix the position of the at least one support plate relative to the base member. The portable tablet folio can have a tablet computer wirelessly coupled to the keyboard and supported in a first position by the at least one support plate. A tablet computer can be wirelessly coupled to the keyboard and supported in a first position by the at least one support plate and a second position by the at least one outer plate.

Some embodiments can include a portable tablet folio having a keyboard with a stand receiving mechanism and a triangular stand configured to be removably coupled to the stand receiving mechanism of the keyboard, the triangular stand having a base member, an inner plate, and at least one outer plate wherein the inner plate and outer plate are configured to rest in a flat position and articulate to a triangular support position. The portable tablet folio can further include a locking mechanism configured to fix the position of the inner plate relative to the base member and a locking mechanism configured to fix the position of the outer plate relative to the base member. The triangular stand can be configured to support a tablet computer and can do so when the triangular stand is not coupled to the keyboard. The keyboard and triangular stand can be configured to lay substantially flat against a tablet computer. The portable tablet folio can further include a tablet computer wirelessly coupled to the keyboard and supported in a first and second position by the triangular stand. The base member can have at least one elongate member configured to be received by the stand receiving mechanism.

These and other features of the applicant's teachings are set forth herein.

BRIEF DESCRIPTION OF THE DRAWINGS

A skilled person in the art will understand that the drawings, described below, are for illustration purposes only. The drawings are not intended to limit the scope of the applicant's teachings in any way and may not be to scale.

DETAILED DESCRIPTION

Some embodiments of the present invention include a portable tablet folio stand that is designed for use in multiple modes. The stand can allow a user to view the tablet from multiple angles, such as a movie viewing angle and a working angle. In the movie viewing angle, the tablet is optimally positioned for viewing the tablet screen, for instance to watch videos. In the working angle, the tablet is optimally positioned for performing tasks such as typing on the tablet. In some embodiments, the tablet stand can be configured to be portable and detachably coupled to a keyboard.

As used herein a "tablet" is defined broadly as a portable electronic device, such as a tablet computer, mobile phone, video game console, video playback device, or any other portable electronic device. As used herein a "keyboard" is a peripheral computer input device that can, but is not required to, comprise keys for data input. As contemplated by one having ordinary skill in the art, a keyboard/keyboard member can include any input device used in conjunction with a tablet. As used herein a "stand"/"stand member" can be any device designed to support another device, such as a tablet, in a desired position.

Figure 1:
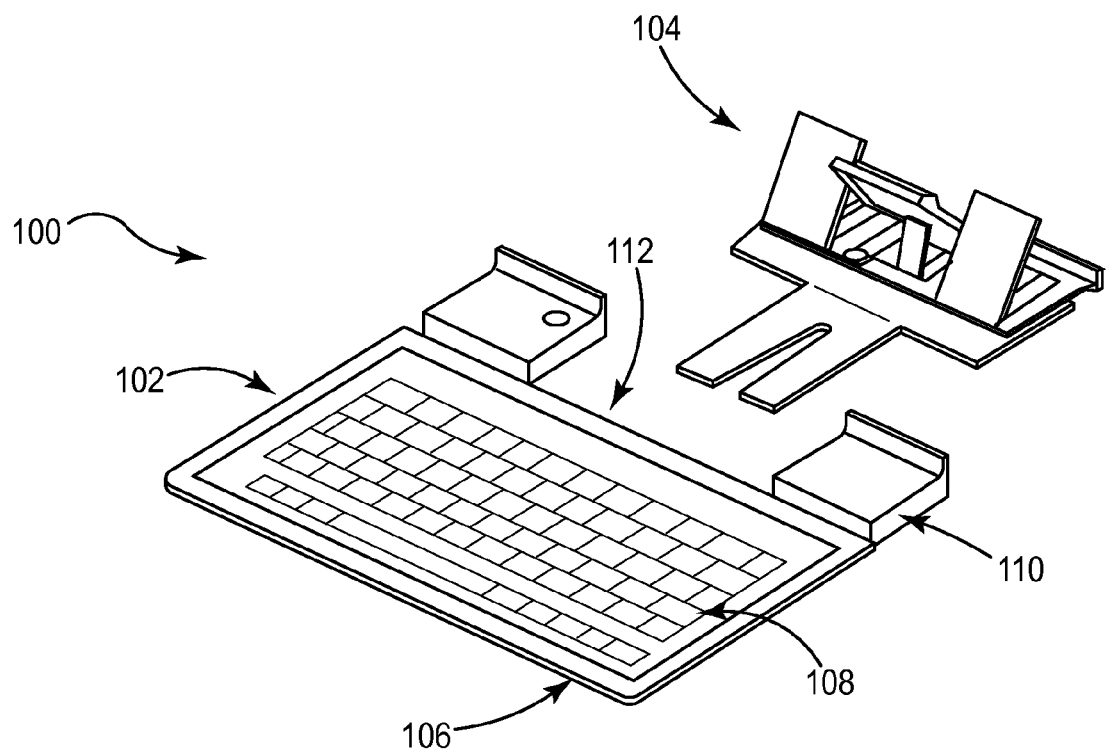
FIG. 1 depicts a partial side view of an embodiment of a portable folio stand. The folio stand comprises a keyboard member and a stand member.

FIG. 1 depicts a partial side view of an embodiment of a portable tablet folio 100. The folio 100 comprises a keyboard member 102 and a stand member 104. As shown in these embodiments, the stand member 104 can optionally be coupled to the keyboard member 102, i.e. the stand member 104 can be detachably coupled, or connected, to the keyboard member 102. By providing a detachable connection between the stand member 104 and the keyboard member 102, a user is given greater flexibility and portability. The stand member 104 includes an elongated member 127 (see FIG. 3A) which can be received by a space made under the keyboard member 102. As shown in FIG. 3C, the stand member 104 has protruding rims 142 on both sides, and the rims slide into grooves which are located in corresponding positions of the inner side surface of the supporting base member 116 (see FIG. 2). When pushed all the way, the stand member 104 becomes fixed to keyboard member 102 with a spring latch mechanism 144.

As shown in FIG. 1, the keyboard member 102 can include a face portion 106, a data input portion 108, a tablet supporting portion 110, and a stand receiving portion 112. The keyboard face portion 106, also referred to as a keyboard base portion, can be configured to provide a durable exterior cover for the portable folio 100 and may also be configured for decorative or aesthetic features. The face 106 can be positioned generally opposite the data input portion 108. The data input portion 108 can comprise elements known in the art for data entry, such as depressible plastic keys or other touch-based entry elements. The keyboard member 102 can house and incorporate known electronics (not shown) configured to transmit user-entered manipulations into electrical signals. The keyboard member 102 can optionally be configured for wireless connections to tablets, such as Bluetooth or WiFi connection. In an embodiment, the keyboard member 102 is connected to a tablet through Bluetooth connection while the tablet is being supported by the portable tablet folio 100.

Figure 2:
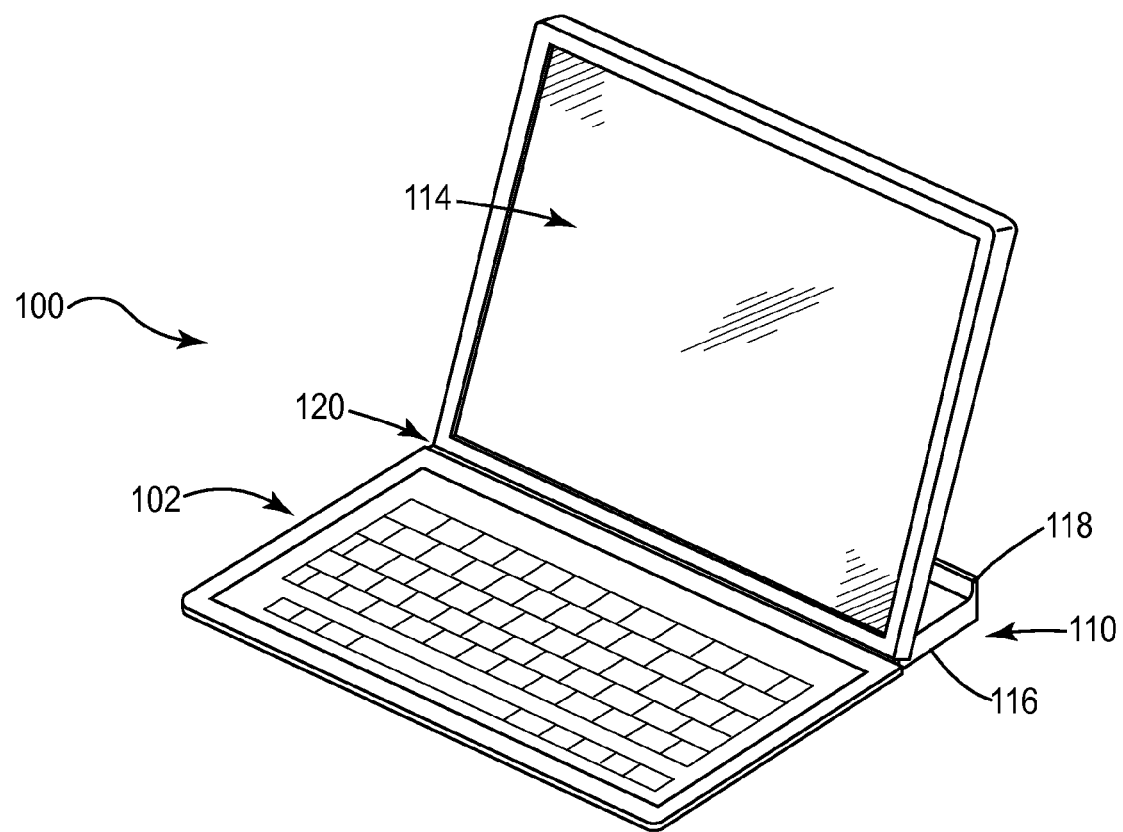
FIG. 2 depicts a partial side view of an embodiment of a portable folio stand wherein the portable folio stand is supporting a tablet.

FIG. 2 depicts a partial side view of an embodiment of a portable tablet folio 100 wherein the portable tablet folio 100 is supporting a tablet 114. The tablet supporting portion of the keyboard member 102 can comprise a supporting base member 116, wherein the supporting base member 116 can be substantially flat. The tablet supporting portion 110 can include at least one support flange 118 connected to the supporting base member 116. The support flange 118 can be configured to support an end of a tablet 120 such that the tablet 114 does not slide or otherwise fall off of the portable tablet folio 100. For instance, the support flange 118 can have a substantially L-shaped design, as shown in FIG. 1, such that the tablet is supported along a horizontal plane by the support flange 118. The support flange 118 can be disposed only along one edge of the keyboard supporting base member 110, such as just along a back edge of the keyboard supporting base member 110. In some embodiments, the support flange 118 can be disposed along a multiple edges of the keyboard supporting base member 118, including a side edge. In some embodiments, the support flange 118 can be formed along an edge of the data input portion 108 and can form a supporting channel 120, as shown in FIGS. 1 and 2. It should also be noted that in some embodiments, the tablet supporting portion 110 can be entirely formed as part of the stand member 104, and not the keyboard member 102, or can be formed on portions of both the stand member 104 and the keyboard member 102. The tablet support portion 110 can be formed of any material suitable for supporting the weight of a tablet 114, such as thermosetting plastics or thermoplastics, and can further include material that has a coefficient of friction such that the tablet 114 will resist sliding, for instance a silicone coating.

Figure 3A:
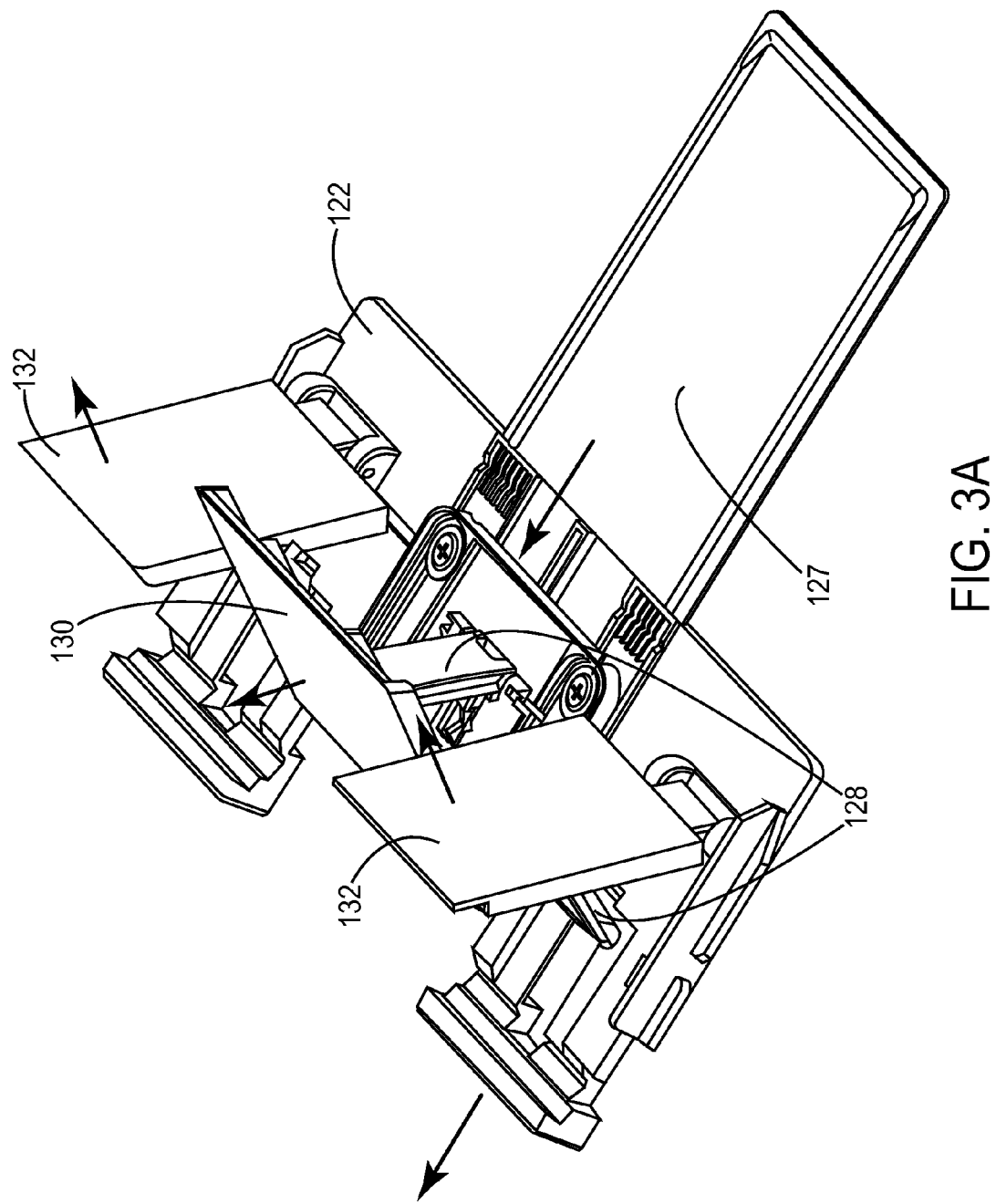
FIGS. 3A-3C depict an embodiment of a portable folio stand wherein the stand member is detached from the keyboard member.
Figure 3B:
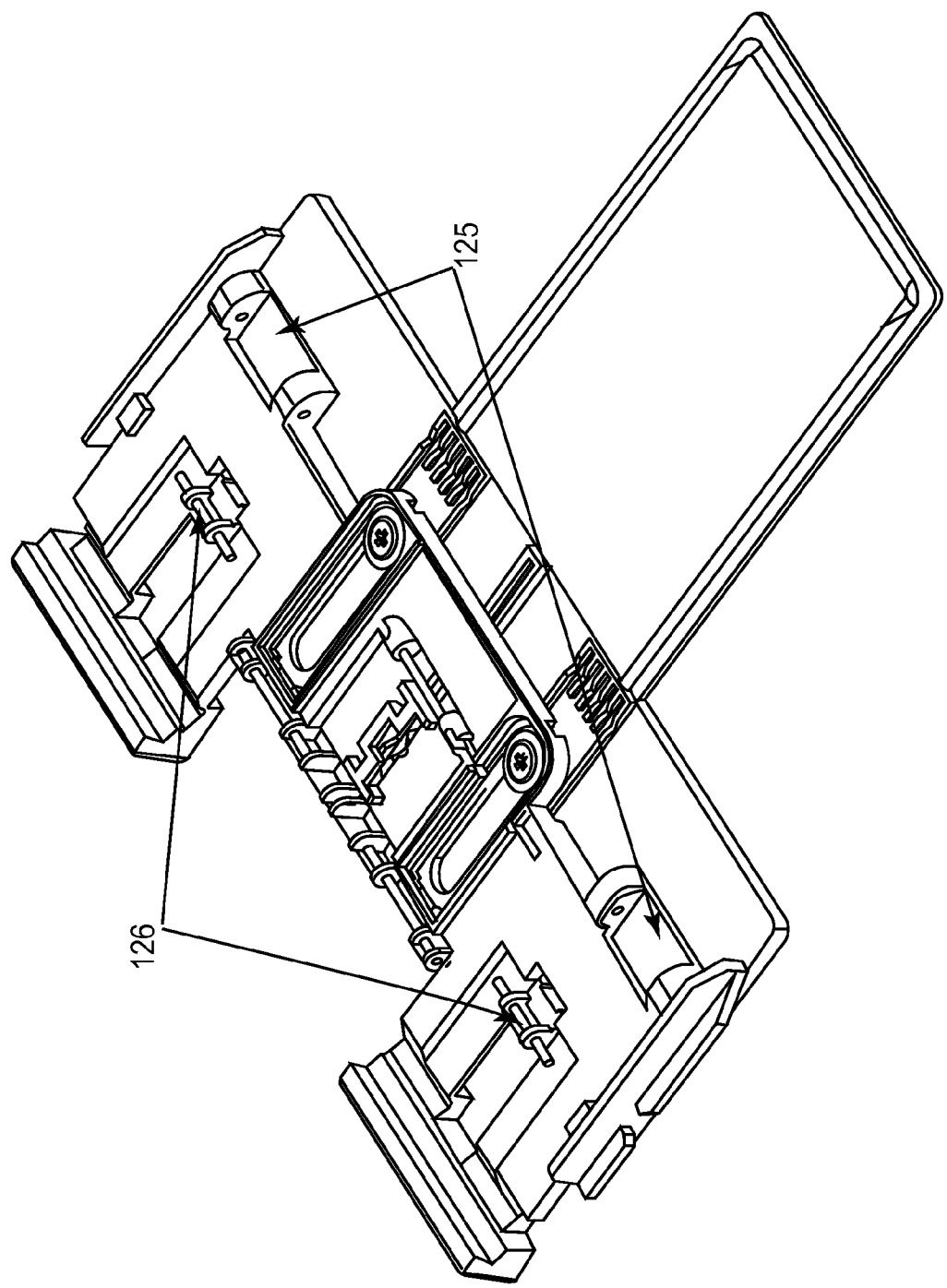
Figure 3C:
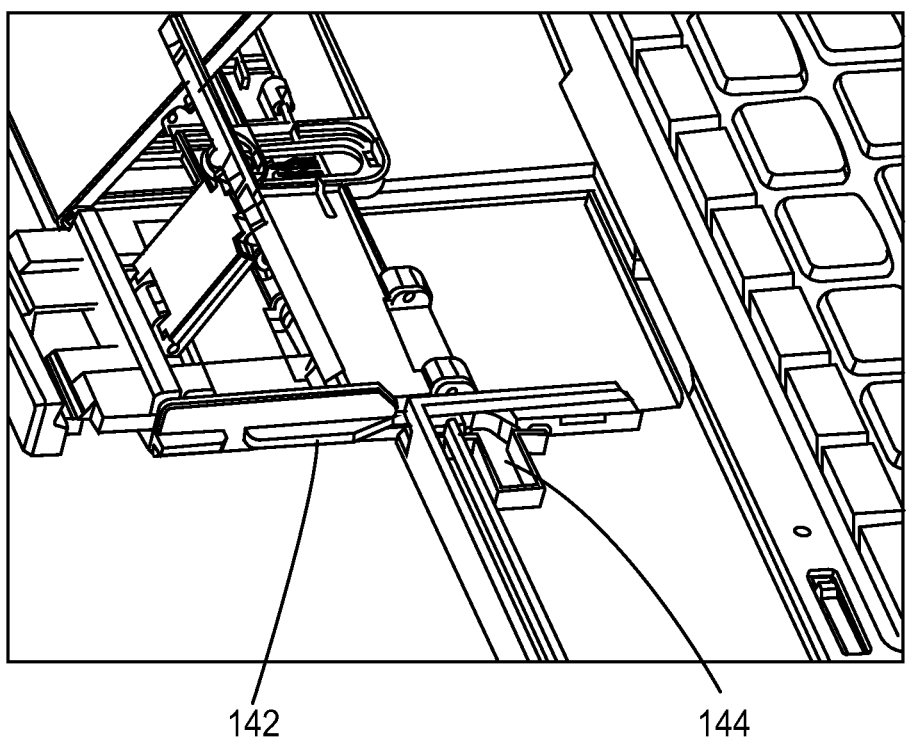

FIG. 3A depicts a partial side view of an exemplary stand member 104. The stand member 104 can include a stand base member 122, at least one support plate 124 that is configured to be manipulated by a user, and the elongate member 127 for coupling the stand member 104 to the keyboard member 102. In some embodiments, the stand member 104 is configured to support a tablet 114 in multiple positions—such as a work position and a movie viewing position. In other embodiments, the stand member 104 can include multiple support plates. More particularly, this embodiment shown in FIG. 3A can include an inner, or first, support plate 130 and at least one outer, or second, support plate 132. The inner and outer plates are supported by linkage supports 128 that rotatably support the plates 130/132. The inner and outer support plates 130/132 are coupled by a link mechanism (not shown) such that when the inner support plate 130 is pulled up from a flat position, the outer plates 132 also move to an elevated configuration. As shown in FIG. 3B, the support plates 130/132 are rotatably supported on pivots 125 and the linkage supports 128 are rotatably supported on pivots 126.

Figure 4:
FIG. 4 depicts a schematic side view of the stand member having a support plate allowing a first usage position and a second support plate allowing a second usage position.

FIG. 4 depicts a schematic side view of some embodiment wherein the stand member 400 can include only a single, first support plate 402 that is configured to articulate from a substantially flat, storage position to an angular support position. The support plate 402 can be coupled to the stand base member 404 in any articulable fashion, including a pivoting hinge 406. For instance, a user can pull a first support plate 402 in an upward direction thereby causing the first support plate 402 to articulate relative to the stand base member 404 at the pivot hinge 406. The connection point of the support plate 402 to the stand base member 404 can be configured to support the weight of a tablet in a vertical and horizontal direction such that the support plate 402 can fully support the weight of the tablet. A locking mechanism (not shown) can be configured to angularly fix the support plate 402 in a desired position relative to the stand base member 404.

Figure 5:
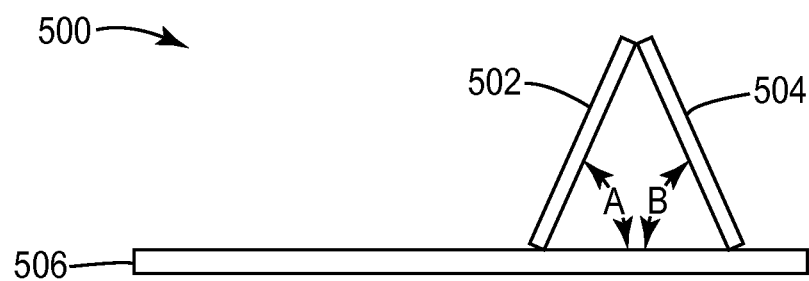
FIG. 5 depicts an embodiment wherein a tablet is supported in a work mode by the portable folio stand.

FIG. 5 depicts a schematic side view of the stand member 500 having a first support plate 502 allowing a first usage position and a second support plate 504 allowing a second usage position. As shown in FIG. 5, a first support plate 502 can be fixed at angular position A relative to the stand base member 506 such that the tablet (not shown) is easily accessible to a user using a keyboard member (not shown). A second support plate 504 can be fixed at an angular position B such that the user can easily view the screen of the tablet (not shown), for instance for video watching. Angular position A and angular position B can be approximately 70 degrees. When not actively supporting a tablet, the stand member 500 can be folded so as to lay substantially flat and can be flush with the keyboard member (not shown) for easy storage. As shown in FIG. 5, the first support plate 502 and second support plate 504 can be articulated to create a substantially triangular shape. In this setting, a tablet can be positioned on either side of the triangular stand so as to provide optimal work space or viewing space for a user. The first and second support plates 502, 504 can be configured to easily articulate in tandem, also referred to as co-articulation. When so configured, a force applied to one plate will cause articulation of both the plate being directly manipulated and the other corresponding plate as well. This co-articulation can be achieved through a linkage mechanism (not shown), or any other known method such as tongue-in groove coupling of the plates.

The stand member 104 can further include a support flange 118 (see FIG. 2). The support flange 118 can be configured to support an end of a tablet 114 such that the tablet 114 does not slide or otherwise fall off of the stand member 104. For instance, the support flange 118 can have a substantially L-shaped design, as shown in FIGS. 1-4, such that the tablet is supported along a horizontal plane by the support flange 118. The stand member 104, 400, 500 can be formed of any material suitable to bear the weight of the tablet and durable enough to maintain multiple uses, for instance thermosetting plastics and thermoplastics can be used.

Figure 6:
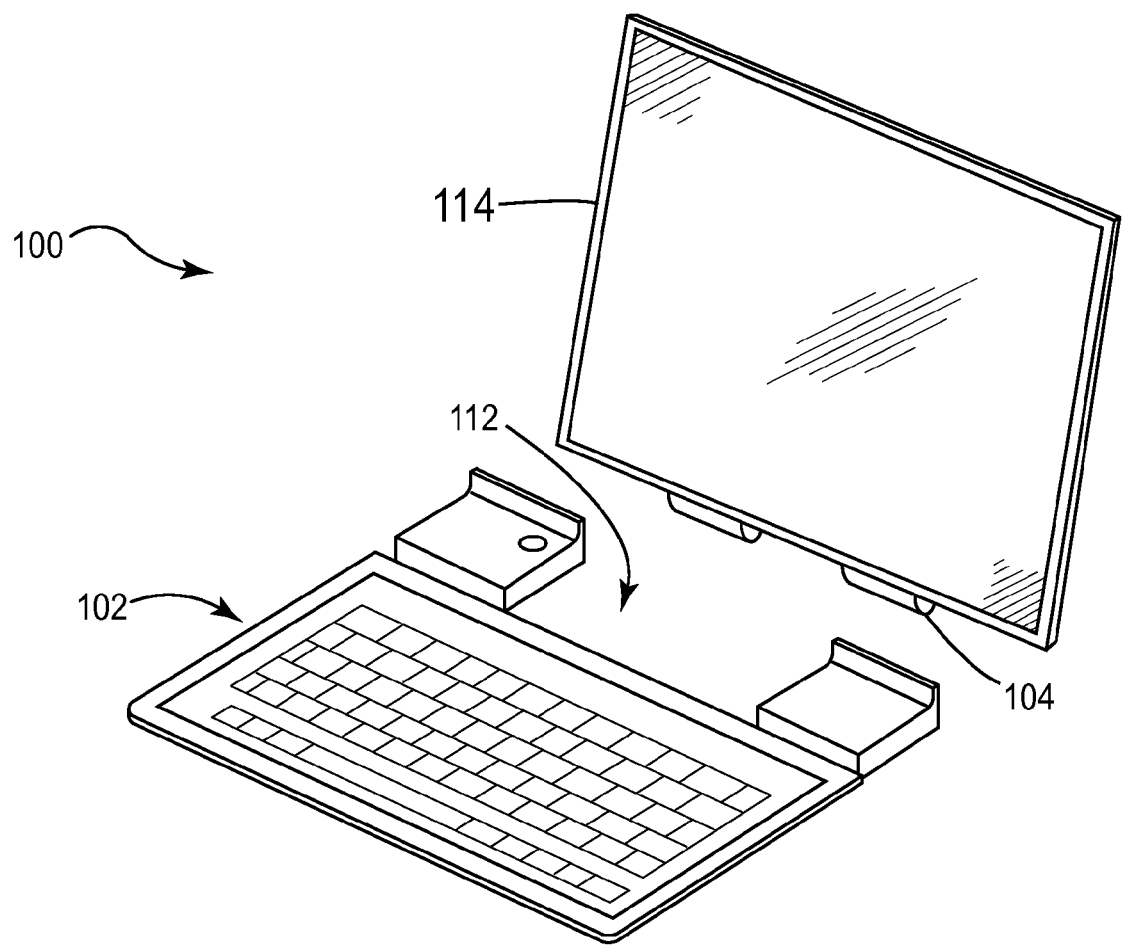
FIGS. 6 and 7 depict an embodiment wherein a tablet is supported in a movie viewing mode by the portable folio stand.

FIG. 6 depicts a partial side view of an embodiment of a portable tablet folio 100 wherein the stand member 104 is detached from the keyboard member 102 and supporting a tablet 114. The keyboard member 102 can include a stand receiving mechanism 112 that allows a user to quickly and easily detach the stand member 104 from the keyboard member 102. In some embodiments, the stand receiving mechanism 112 of the keyboard can be a female-type receiving mechanism, corresponding to a male-type portion of the stand member 104. Any other known latch mechanism can be used to create a detachable connection between the stand receiving mechanism 112 and the stand member 104, for instance, a magnetic connection, a retractable bearing, a biased latch, or socket-type connector can be utilized to provide the detachable connection. Also, a rail can be formed on the stand member 104, which can be fixed to the keyboard member 102 by the force of a spring formed on the keyboard member 102. In some embodiments, the stand receiving mechanism can be electrically controlled and powered, or can be manually manipulated.

As shown in FIG. 3A, the keyboard coupling mechanism can correspond to the stand receiving mechanism 112 and can have at least one elongate member 127 configured to be received by the keyboard member 102. The elongate member 127 can be configured to brace the stand member 104 against any moment, or torquing, forces that can cause the stand member 104 to tip over in a given direction. The elongate member 127 can provide support to the stand member 104 by transferring some of said forces to the keyboard member 102 or to another surface if the stand member 104 is uncoupled from the keyboard member 102.

Figure 7:
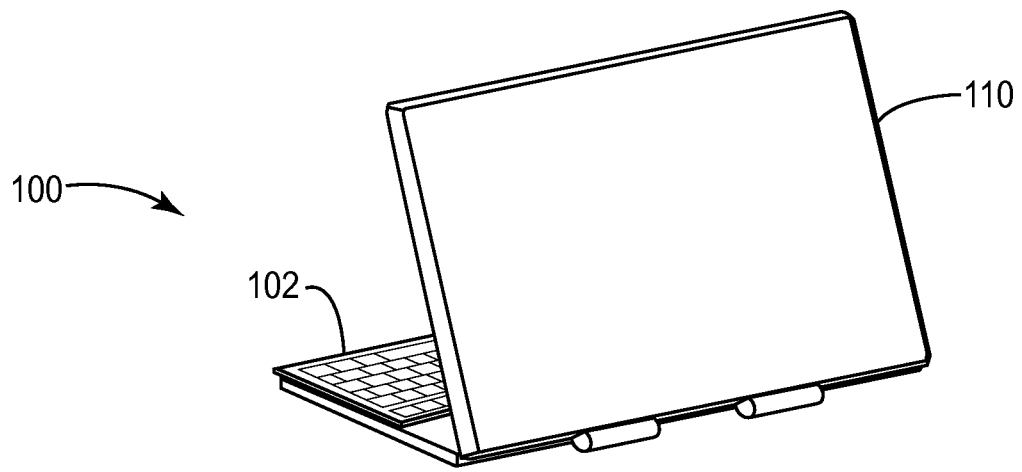

FIG. 7 depicts an embodiment wherein a tablet 110 is supported in a movie viewing mode by the portable tablet folio 100. In this embodiment, the tablet 110 is positioned in a movie viewing mode with the screen of the tablet 110 facing opposite the keyboard member 102. When in this position, the portable tablet folio 100 is supporting the weight of the tablet 110 and yet remaining generally out of the field-of-view of the user. Because the portable tablet folio 100 is generally out-of-view, the tablet 110 is in an optimal position for movie viewing.

The section headings used herein are for organizational purposes only and are not to be construed as limiting the subject matter described in any way. While the instant invention is described in conjunction with various embodiments, it is not intended that the invention be limited to such embodiments. On the contrary, the instant invention encompasses various alternatives, modifications, and equivalents, as will be appreciated by those of skill in the art.

What is claimed is:

1. A portable tablet folio, comprising:
a keyboard member configured to be wirelessly and physically coupled to a tablet computer such that at least a portion of the keyboard member is disposed on opposite sides of the tablet computer when physically coupled thereto;
a collapsible tablet stand member configured to detachably couple to the keyboard member and to the tablet computer, the tablet stand member being further configured to operate in a first usage mode in which the tablet stand member supports the tablet computer by itself while not being coupled to the keyboard member and a second usage mode in which the tablet stand member supports the tablet computer while being coupled to the keyboard member.

2. The portable tablet folio of claim 1, wherein the tablet stand member further comprises:
a base having at least one support flange on at least a side of the base;
a first plate pivotably coupled to the base and configured to lay flat in a storage position and to articulate to a usage position thereby allowing the stand to operate in either the first usage mode or the second usage mode.

3. The portable tablet folio of claim 2, further comprising:
a second plate pivotably coupled to the base and the first plate, wherein the second plate is configured to lay in a flat storage position and to articulate to a usage position thereby allowing the stand to operate in the first usage mode or the second usage mode.

4. The portable tablet folio of claim 2, wherein the base further comprises a keyboard coupling mechanism having at least one elongate member configured to be received by the keyboard member.

5. The portable tablet folio of claim 1, further configured to allow the tablet stand member to lay substantially flat.

6. The portable tablet folio of claim 1, wherein the portable tablet folio further comprises a support flange.

7. The portable tablet folio of claim 1, wherein the keyboard member is configured to couple to the tablet stand member via protruding rims of the tablet stand member that slide into grooves of the keyboard member.

8. The portable tablet folio of claim 1, wherein the keyboard member is configured to couple to the tablet stand member via a spring latch mechanism.

9. A portable tablet folio, comprising:
a keyboard member comprising input keys and a stand receiving mechanism; and
a stand member configured to be detachably coupled to the keyboard member at the stand receiving mechanism, the stand member comprising at least three planar support plates and a base wherein the at least three support plates are pivotably coupled directly to the base at at least three distinct attachment locations and directly to another of the at least three support plates so as to allow the at least two support plates to be substantially flat to the base in a first position and extend at an angle to support weight in a second position.

10. The portable tablet folio of claim 9, further comprising:
a locking mechanism configured to fix a position of at least one of the at least three support plates relative to the base.

11. The portable tablet folio of claim 9, further comprising:
a tablet computer wirelessly coupled to the keyboard member and supported in a first position by at least one of the at least three support plates.

12. The portable tablet folio of claim 8, further comprising:
a tablet computer wirelessly coupled to the keyboard member and supported in a first position and a second position by the at least three support plates.

13. A portable tablet folio, comprising:
a keyboard member having a stand receiving mechanism;
a triangular stand configured to be removably coupled to the stand receiving mechanism of the keyboard member, the triangular stand having a base, two outer plates being separately connected to the base, and an inner plate disposed entirely between the two outer plates, wherein the inner plate and the outer plates are all configured to rest in a flat position and wherein the inner plate and the outer plates are all configured to co-articulate to a triangular support position.

14. The portable tablet stand of claim 13, further comprising:
a locking mechanism configured to fix a position of the inner plate relative to the base.

15. The portable tablet stand of claim 13, further comprising:
a locking mechanism configured to fix a position of at least one of the outer plates relative to the base.

16. The portable tablet stand of claim 13, wherein the triangular stand is configured to support a tablet computer.

17. The portable tablet stand of claim 13, wherein the triangular stand is configured to support a tablet computer when the triangular stand is not coupled to the keyboard member.

18. The portable tablet stand of claim 13, wherein the keyboard member and triangular stand are configured to lay substantially flat against a tablet computer.

19. The portable tablet stand of claim 13, further comprising:
a tablet computer wirelessly coupled to the keyboard member and supported in a first and second position by the triangular stand.

20. The portable tablet stand of claim 13, wherein the base member comprises at least one elongate member configured to be received by the stand receiving mechanism.

21. The portable tablet folio of claim 13, wherein the outer plates pivot about a first axis and the inner pivot plate pivots about a second axis, the first axis being spaced apart from the second axis.

* * * * *